United States Patent [19]
Lubachevsky

[11] Patent Number: 5,764,732
[45] Date of Patent: Jun. 9, 1998

[54] CALLED PARTY MAILBOX SERVICE

[75] Inventor: Boris Dmitrievich Lubachevsky, Bridgewater, N.J.

[73] Assignee: AT&T Corp, Middletown, N.J.

[21] Appl. No.: 581,078

[22] Filed: Dec. 29, 1995

[51] Int. Cl.⁶ ................................................ H04M 1/64
[52] U.S. Cl. .............................. 379/67; 379/89; 379/114
[58] Field of Search ............................. 379/67, 69, 70, 379/87, 88, 89, 112, 114, 121, 124

[56] References Cited

U.S. PATENT DOCUMENTS

| | | | |
|---|---|---|---|
| 4,837,798 | 6/1989 | Cohen et al. | 379/88 |
| 4,932,042 | 6/1990 | Baral et al. | 379/89 |
| 4,972,461 | 11/1990 | Brown et al. | 379/67 |
| 5,003,575 | 3/1991 | Chamberlin et al. | 379/89 |
| 5,150,399 | 9/1992 | Yasuda | 379/67 |
| 5,260,986 | 11/1993 | Pershan | 379/57 |
| 5,335,266 | 8/1994 | Richardson, Jr. et al. | 379/88 |
| 5,353,259 | 10/1994 | Howes et al. | 379/89 |
| 5,381,465 | 1/1995 | Carter et al. | 379/89 |
| 5,481,597 | 1/1996 | Given | 379/88 |
| 5,528,670 | 6/1996 | Elliot et al. | 379/89 |
| 5,535,264 | 7/1996 | Starr et al. | 379/88 |

*Primary Examiner*—Daniel S. Hunter

[57] ABSTRACT

A service establishes called party mailboxes (CPMB) for specified duration of time upon request of a calling party when a called party is unable or unwilling to respond to the calling party. The CPMB service permits a CPMB to be accessed by a called party and permits a CPMB to be modified by authorized users. The status of access information is available to the calling party which access information characterizes the extent of access to the established mailbox by the called party. The CPMB is advantageously implemented by a CPMB control system comprising a processor and memory which CPMB control system is connected to a communications network.

12 Claims, 3 Drawing Sheets

CALLED PARTY MAILBOX SERVICE

TECHNICAL FIELD

The invention relates to the field of communication services and particularly to mailbox services.

BACKGROUND

A communication system enables a calling party to employ a terminal (e.g. a wired telephone, personal computer or cellular phone) connected to the system to exchange information (e.g. signals representing voice, text, video and data) with a called party also employing a terminal connected to the system. However, the called party is often unable to participate in the exchange of information as for example, when a telephone call goes uncompleted because the called party does not answer or because the line is busy.

Several solutions to this problem have been developed. For example, the called party may have a telephone answering machine so that the calling party may leave a voice message for an absent called party which message the called party may later access. Similarly, a called party may utilize a voice mailbox service. A mailbox is a medium or device (such as magnetic tape or random access memory) in which information can be stored and accessed. A service provider (such as a local exchange carrier) stores information from calling parties when the called party is unable to participate in the exchange of information. The called party, at some convenient time, can then access the voice mailbox (as for example, by dialing a special telephone number and providing a password) to receive the information. Yet another solution to this problem is a call-waiting service. A call-waiting service enables a called party, while already engaged in a telephone call, to detect when a new call from another party is received. The called party may then switch between the calls.

All of these solutions, however, depend on the called party making provisions for receiving information when the called party is unavailable or unwilling to participate in the exchange of information. Although services are offered that attempt to deliver information left by a calling party (such as by periodically redialing the telephone number of the called party over a time period), such services and solutions do not enable a calling party to determine the extent to which a called party has accessed the information. Thus, there is a need for a service for enabling a calling party to make information available to a called party when the called party has not made such provisions and that enables a calling party to verify the extent to which the called party has accessed the information.

SUMMARY

In accordance with the present invention a mailbox service is used in which a calling party may establish a mailbox for a called party and in which the status of access information is available to the calling party which access information characterizes the extent of access to the established mailbox by the called party. The method advantageously provides a notification to the called party when information is input to the established called party mailbox and provides access for the called party to access the called party mailbox.

DETAILED DESCRIPTION

Figure 1:
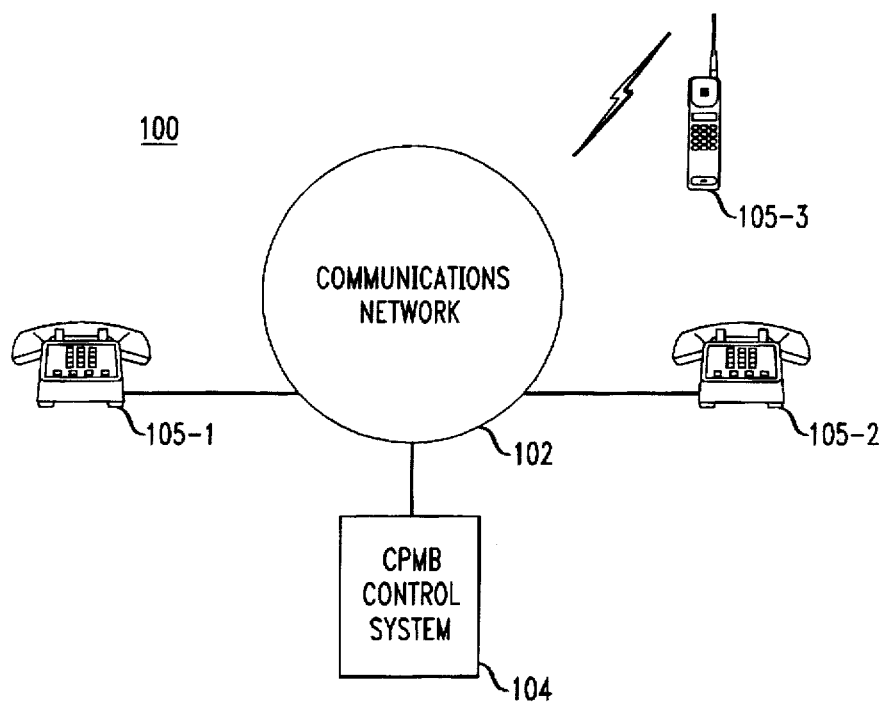
FIG. 1 illustrates a system in which the inventive method may be practiced.

FIG. 1 illustrates communications system 100 in which the inventive method for providing a called party mailbox (CPMB) service may be practiced. The service establishes a CPMB for a called party for a specified duration or period of time at the request (and optionally at the expense) of a calling party. The service enables a calling party to obtain the status of access information. The access information characterizes the extent to which the called party has accessed information in the CPMB. The CPMB may be used to store information provided by the calling party. Communication system 100 comprises terminals 105-i which may be employed by users of communication system 100 for sending and receiving information via communications network 102. Terminals 105-i may be wired terminals (such as terminals 105-1 and 105-2 which are wired telephones) or wireless terminals (such as terminal 105-3 which is a cellular phone). Connected to communications network 102 is CPMB control system 104 which is advantageously used to implement the CPMB service.

Figure 2:
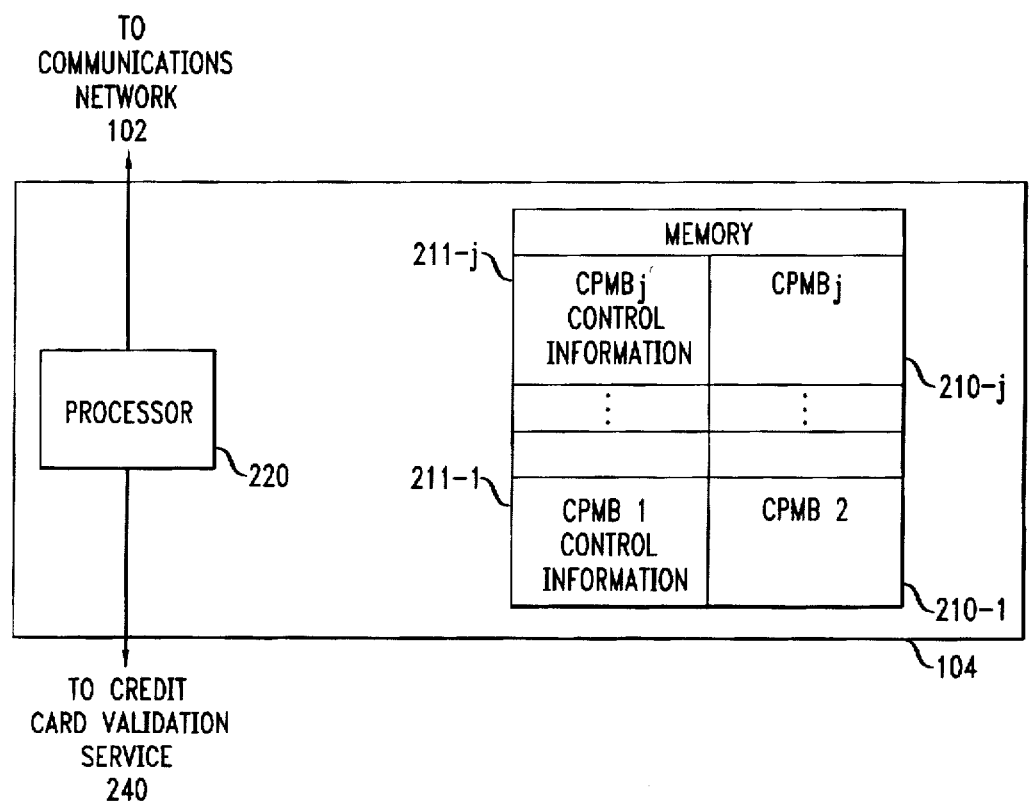
FIG. 2 illustrates a system for providing a service for establishing mailboxes for called parties.

CPMB control system 104 is illustrated in further detail in FIG. 2. CPMB control system comprises processor 220 and memory 208. Processor 220 is connected to communications network 102, and thus processor 102 is able to receive a request to establish a CPMB from a calling party using a terminal connected to communications network 102. Processor 102 may also advantageously extend the duration of an already-established CPMB. Information from a calling party is advantageously stored in CPMB 210-j in memory 208 which memory also comprises portion 211-j for storing control information associated with each respective CPMB 210-j. Portion 211-j advantageously stores control information relating to: the duration of the CPMB, authorized services, status of access information, etc., as described below. Processor 220 is also advantageously connected to credit card validation service 240 which is used to validate charges for establishing the CPMB when a credit card is used for payment.

Figure 3:
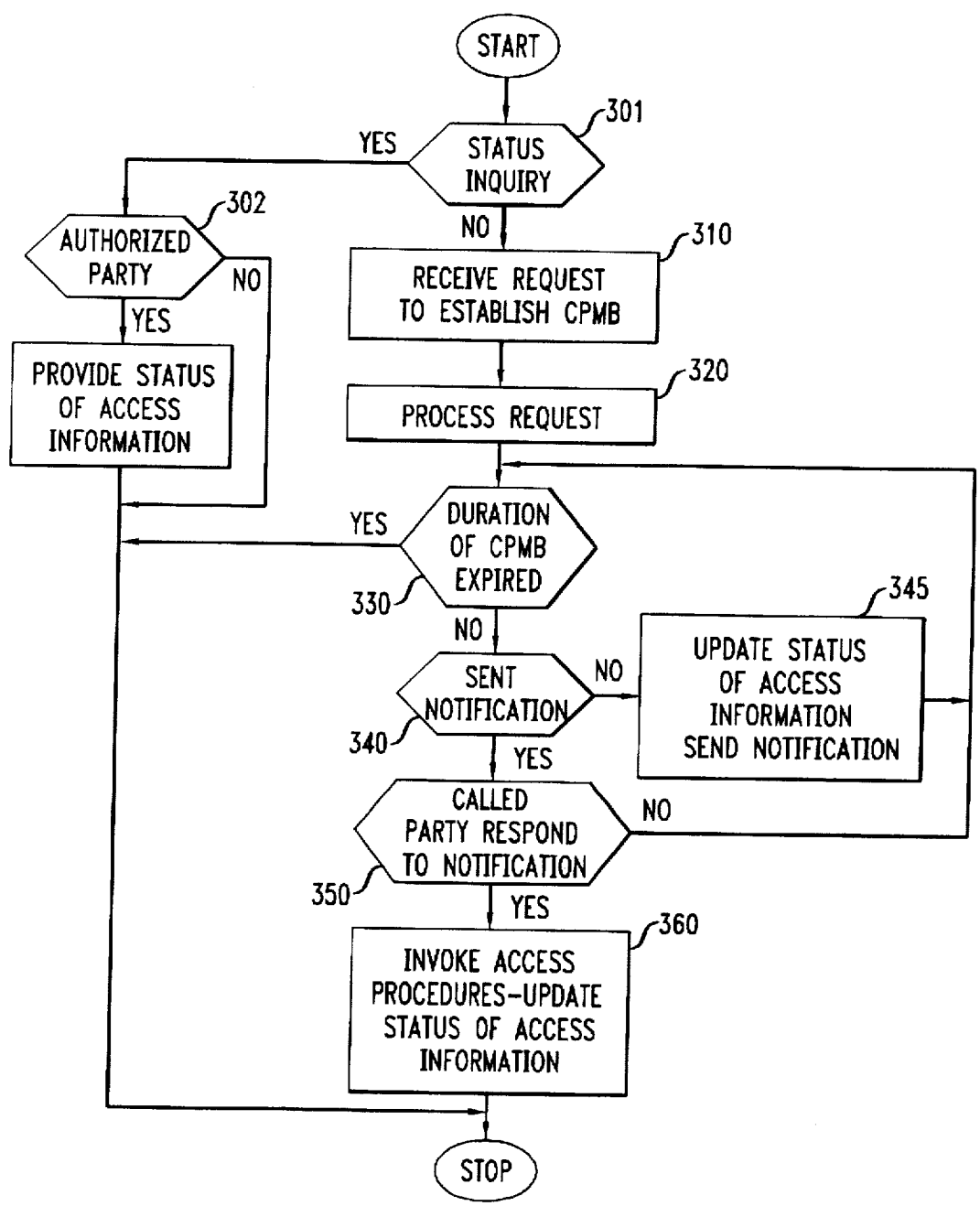
FIG. 3 illustrates steps in the inventive method for providing a called party mailbox service.

FIG. 3 is a flow chart of steps in the inventive method for a CPMB service. Once a party is connected to the CPMB service (step 301), if the party is making a status inquiry, step 302 is executed in which the status of access information is provided. A request regarding a CPMB is received from a terminal (e.g. terminal 105-i of FIG. 1) in step 310 and is advantageously relayed to CPMB control system 104. A request may be initiated, for example, by a calling party by dialing a specific telephone number assigned to a CPMB service provider when the calling party either receives a busy signal or no answer when dialing the called party. A request could also be initiated in response to a prompt from communications network 102 which prompt is activated when a busy signal is detected or after a prescribed number of rings of the called party's phone has occurred. The request is processed in step 320.

Figure 4:
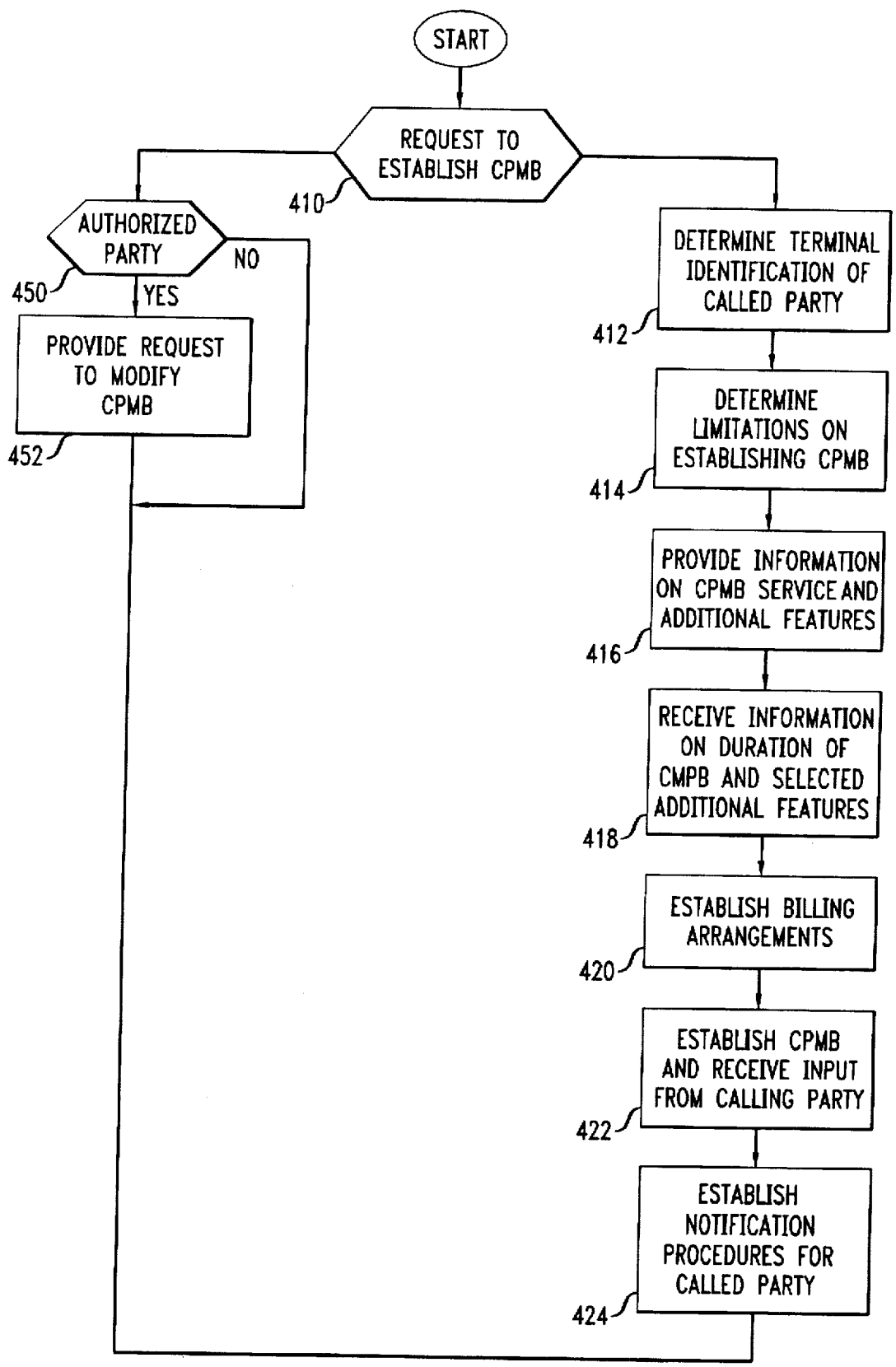
FIG. 4 illustrates additional steps for providing a called party mailbox service.

FIG. 4 illustrates further steps useful in executing step 320. In step 410 it is determined whether the request is to establish a CPMB or to modify a previously established CPMB. If the request is to establish a CPMB (i.e. the "yes" branch from decision box 410 is followed), steps 412–424 (which form a part of a set of CPMB management procedures) are invoked. In step 412 identification of terminals associated with the called party (e.g., the number of the telephone of the called party) for which the CPMB is to be established is received. The identification may be obtained from the called party requesting the CPMB or the number may be available automatically (e.g., by virtue of the calling party automatically being switched to the CPMB service when getting no answer or a busy signal from the terminal of the called party). In step 414 it is determined if there are any limitations on establishing a CPMB for the called party. For example, it may be that some called parties may not wish to have a CPMB established for them and may be able to block, or limit, their establishment.

In step 416, information regarding available and non-prohibited CPMB services are advantageously provided to the calling party. For example, the information may specify fees involved for establishing the mailbox for various lengths of time. The information may also specify additional features that are available (perhaps) at an additional cost. Such additional features may include permitting the calling party to identify other terminals (as for example by identifying telephone numbers or e-mail addresses associated with other terminals) that the called party may access and to which a notification should be sent that a CPMB has been established. Such additional service features may also include permitting a calling party to add further information to an already-established CPMB. A service feature advantageously included in the CPMB management procedures provides the status of access information to the calling party (or other authorized party) which characterized the extent to which CPMB services have been utilized. In particular, information is made available to the calling party regarding when notification was sent that a CPMB had been established, whether the CPMB has been accessed, when it was accessed and whether the information in the mailbox was accessed or simply erased. The information can be made available, for example, by having the CPMB service notify the calling party when the called party is notified that a CPMB has been established and/or when the called party accesses the CPMB. In another example (steps 302 and 304), the calling party may contact the CPMB service and (assuming a proper password or other authorization is provided) obtain the status of the access information.

In step 418, information is received from the calling party relating to the duration of time for which the CPMB is to be established and relating to which additional features, if any, are desired. The information is advantageously stored as control information in memory 208. In step 420 a billing arrangement is established (e.g. whether the costs of the CPMB are assessed against or billed to a telephone account or credit card) and the billing arrangement is verified (e.g. credit card authorization is obtained). Once billing arrangements are determined, in step 422 the CPMB service then a establishes a mailbox for the called party and optionally assigns a password associated with the CPMB and receives information input from the calling party which information is intended for, and may be accessed by, the called party. In step 424 the CPMB service establishes procedures for notifying the called party.

Returning to step 410, if the request is to modify the CPMB such as by extending the duration of the CPMB or change additional features associated with CPMB or reestablish the CPMB if it has expired (ie. the "no" branch from decision box 410 is followed), steps 450 and 452 in the set of CPMB management procedures are invoked. In step 450, the procedures determine if the request is from a party authorized to make the request (e.g., the calling party who initially established the CPMB). Authorized parties may be, for example, those parties given a specified password (which password is established at the time the CPMB is established) by the calling party who initially established the CPMB. If the request is not from an authorized party, the CPMB management procedures end. If the request is from an authorized party, the request to modify or reestablish the CPMB is processed (e.g., the service will determine if the modifications are permitted by the called party and/or regulations, CPMB control information will be updated and billing will be adjusted accordingly).

Returning to FIG. 3, in step 330 the CPMB service checks to determine if the duration for which the CPMB was to be established has expired. If it has, the CPMB is terminated and may no longer be accessed. As discussed above, however, the CPMB service advantageously permits the same CPMB to be reestablished or extended by authorized parties upon proper billing arrangements (steps 450 and 452 of FIG. 4). If the duration of the CPMB has not expired, in step 340 the CPMB service determines if a notification should be sent to the called party. The method of notification is optionally determined during the establishment of the CPMB (e.g., the notification may only be given during certain hours) or by a default procedure. The notification may comprise a greeting provided by the calling party when establishing the CPMB. The notification advantageously is provided to the calling party when the called party next accesses a terminal associated with the called party (as, for example, the called party's own telephone) connected to the communications network. The notification may advantageously be provided when the communications network determines that a terminal associated with the called party is accessing the communications network (e.g., the called party's telephone has gone off-hook). The status of the access information is updated to reflect that the notification was provided in step 345. Step 345 may also include automatic messaging to the calling party that the called party has been notified that a CPMB has been established.

In step 350, the service determines if the called party has responded to the notification and desires access to the CPMB. The called party may respond by dialing a specified phone number (which number may be a toll-free number) to access the CPMB. Alternatively, after the notification is provided, the called party can be queried by the CPMB service as to whether the called party wishes to access the CPMB. If the called party responds to the notification and access is desired, CPMB access procedures are invoked in step 360. Such procedures are advantageously a menu of options that permit the called party to access information in CPMB, erase information in the CPMB, skip some information and advance to other information in the CPMB, etc. The providing of the notification and any response to it are used to update the status of access information in step 360. Step 360 may also include automatic notification to the calling party that the called party has responded to the notification and may include a description of the extent to which the CPMB has been accessed.

Thus, the CPMB service advantageously establishes CPMBs for a called party at the request of a called party. The CPMB service advantageously provides a set of features (e.g., status of access information) and permits authorized users to modify a CPMB (e.g. extend its duration). The CPMB management and access procedures are advantageously invoked using manual techniques (such by using operators) or by automated techniques (such as the CONVERSANT® voice information system) or by combinations of automated and manual techniques.

Fraudulent use of the CPMB service is limited by using proper billing verification methods. Also, the use of passwords to access certain information (e.g. status of access information as whether the called party has accessed the system) and to modify the CPMB can reduce fraud and misuse of the CPMB service.

The method disclosed herein has been described without reference to specific hardware or software. Instead the method has been described in such a way that those skilled in the art can readily adapt such hardware or software as may be available or preferable. The inventive method may be used to for information of any type, including information representing speech, text, video or data.

What is claimed is:

1. A method comprising the steps of:

following the occurrence of a busy or a no-answer condition when a call is placed by a calling party to a called party, receiving a request from said calling party to establish a called party mailbox associated with said called party, and establishing said called party mailbox having an associated set of features, said set of features comprising access information wherein the status of said access information characterizes the extent of access to the established called party mailbox by the called party and wherein said status is available to said calling party.

2. The method of claim 1 wherein the step of establishing further comprises the step of:

assigning a password to the established called party mailbox.

3. The method of claim 1 wherein said request specifies one or more features in said set of features associated with the established called party mailbox.

4. The method of claim 3 wherein said set of features comprises a list of terminals associated with said called party wherein any terminal in said list of terminals may be used to access the established called party mailbox.

5. The method of claim 1 wherein said calling party is assessed a cost associated with the established called party mailbox.

6. The method of claim 5 further comprising the step of:

establishing billing arrangements for a cost associated with the established called party mailbox.

7. The method of claim 1 wherein said request comprises a parameter specifying a period of time over which to establish the called party mailbox.

8. The method of claim 7 further comprising the step of:

extending the specified period of time in response to a request from an authorized user.

9. The method of claim 1 further comprising the step of:

providing a notification to said called party when information is input to the established called party mailbox.

10. The method of claim 9 further comprising the step of:

providing access for said called party to the established called party mailbox.

11. The method of claim 9 comprising the step of:

updating the status of said access information upon providing notification to said called party.

12. The method of claim 10 further comprising the step of:

updating status information upon providing access to the established called party mailbox.

* * * * *